United States Patent [19] [11] 3,927,222
Rosenquest et al. [45] Dec. 16, 1975

[54] METHOD OF PRODUCING EXPANDED CEREAL PRODUCTS OF IMPROVED TEXTURE

[75] Inventors: Allen H. Rosenquest, New Canaan, Conn.; Aloysius J. Knipper, Ramsey; Robert W. Wood, West Milford, both of N.J.

[73] Assignee: Nabisco, Inc., New York, N.Y.

[22] Filed: Jan. 15, 1975

[21] Appl. No.: 541,130

[52] U.S. Cl. ............................................... 426/621
[51] Int. Cl.² .......................................... A23L 1/18
[58] Field of Search ........... 426/343, 351, 447, 448, 426/449, 450, 141, 618, 620, 621

[56] References Cited
UNITED STATES PATENTS 3,580,728   5/1971   Gulstad et al. .................. 426/449 X
3,656,965   4/1972   Strommer et al. .................. 426/449
3,851,081   11/1974  Epstein .......................... 426/448 X Primary Examiner—Raymond N. Jones
Attorney, Agent, or Firm—Gerald Durstewitz; I. Allen Strombeck

[57] ABSTRACT

Expanded ready to eat cereal products of improved texture are produced by mixing with milled grain between 0.2 and 2% of finely divided, insoluble, inert, non-reactive material and processing the mixture through a high temperature and high pressure cooking extruder. The inert materials are selected from the group consisting of titanium dioxide, calcium silicate, silicon dioxide, and aluminum oxide. The resulting products have a structure composed of cells which are substantially all of uniform small size and are of a tender friable texture.

8 Claims, No Drawings

METHOD OF PRODUCING EXPANDED CEREAL PRODUCTS OF IMPROVED TEXTURE

BACKGROUND OF THE INVENTION

The present invention relates to the production of expanded food products and more particularly to expanded cereal products.

Expanded cereal products are commonly made by mixing milled grain with water to form a dough which is then cooked. The cooked dough is fed through an extruder to form a dough strand and the strand is cut at regular intervals to form dough pellets known as half products or collets. The pellets are dried to an optimum water content and are puffed by flash evaporating the water, either by exposure to a high temperature medium (hot air or deep fat) or a reduced ambient pressure (as in gun puffing).

Expanded cereal products may be made more quickly and more inexpensively in one operation by the use of a high temperature, high pressure cooker extruder. The milled grain is fed directly into the extruder where it is cooked by the application of steam and the heat generated by the mechanical working of the dough. Within the extruder the dough is subjected to a high pressure which is rapidly relieved as the dough flows through the extrusion orifice. The dough therefore expands as it exits from the extruder and no additional steps, other than cutting, need be performed upon the product.

It has been found in practice that expanded products produced in this latter manner tend to have less desirable texture than those produced by the former method, in that they tend to be brittle or glassy in nature. This is due to the large, open cellular structure that is characteristic of these products when they are produced at an acceptable bulk density of 4 thru 7 pounds per cubic foot. Only by increasing the bulk density above the desirable upper limit of 7 pounds per cubic foot has it been possible to produce a product with a desirable cell size. These characteristic large open cells also produce a rough surface texture and cause the product to fracture and chip during handling, causing undesirable damage.

The foregoing objects are accomplished by mixing with milled grain a quantity of finely divided nonreactive inert material, heating and working the mixture to produce a dough under pressure, and suddenly releasing the pressure to expand the dough.

DETAILED DESCRIPTION OF THE INVENTION

In accordance with the present invention, expanded ready to eat cereal products having a tender friable texture are produced by mixing with milled grain a small amount of finely divided, insoluble, inert, nonreactive material, and processing the mixture through a high temperature and high pressure cooking extruder.

The milled grain may be corn, oats, wheat, rice or a combination of these grains. The grains are preferably milled to a flour, however, coarser grinds may be used provided the cooking and working of the grains within the extruder is sufficient to break down the grain particles and disperse the inert material uniformly throughout the dough.

The quantity of inert material added to the grain is between about 0.2 and about 2% of the total weight of the grain. The particle size of the major portion of the material is about 4 microns or smaller. The inert material may be titanium dioxide, calcium silicate, silicon dioxide, aluminum oxide or a combination of these compounds. Optional ingredients such as sugar, salt vitamins etc. may be added to the mixture. All the ingredient materials may be mixed together to a batch before addition to the cooking extruder or they may each be added to the extruder continuously at a metered rate for continuous production.

The cooking extruder used is of the type disclosed in U.S. Pat. No. 3,117,006. In the patent, the extruder is illustrated with dough pre-conditioning elements mounted thereto. The preconditioning elements and the extruder have ports through which steam or water is added to the dry ingredients to form a dough. Steam jackets are provided on the preconditioning elements and the extruder barrel to cook the dough as it is being worked by the screws which move the dought through the apparatus. In commercial applications where a high extruder output rate is required, the preconditioning units are necessary to provide sufficient cooking time. However, under circumstances where a low extruder output rate can be tolerated, the preconditioning units may be dispensed with by reducing the number of extrusion orifices to extend retention time within the extruder.

The mixture of dry materials fed to the extruder normally contains about 10 to 12% water, and additional water is added within the extruder to bring the moisture content of the dough to between 12 and 20%. In the extrusion head, the dough is subjected to a high pressure and a temperature which is above the boiling point of water and generally above 300°F.

The dough is extruded in strands through a plurality of orifices. A rotating knife is normally mounted on the extrusion head to cut the strands into short pieces. As the dough emerges from the extrusion orifices, it expands as a result of the sudden drop in pressure.

The products produced according to the present invention were found to have a cellular structure wherein substantially all of the cells were uniform in size and were significantly smaller than the cells formed in products subjected to the same processing but without the incorporation of an inert ingredient. For example, the addition of the inert ingredient at a level of 0.5% was generally found to reduce the cell size from about 110 microns to about 35 microns.

Although the cell size of the products produced according to the present invention was reduced, the bulk density of the products were generally comparable to or less than that of conventionally formed products. Where the bulk density increased, the increase was not great and the product was of acceptable density. The product according to the present invention is considerably more tender and friable than conventional products made with high pressure high temperature cooking extruders. These other products are brittle or glassy in nature and are prone to chipping or shaling of the surface portions.

It is believed that the small cell size and tender structure of the products produced according to the present invention is caused by a reduction in the strength and/or stretchability of the dough as a result of the presence of the inert material. When the moisture in the dough flashes to the gaseous state upon extrusion, the weakened dough forming the walls of the cell breaks while the cells are still small. The weakened dough would also account for the tenderness of the product.

The inert ingredient may weaken the dough by physically interfering with starch gelatinization or by holding water so as to deprive the starch of some of the water needed for complete gelatinization. Each individual particle of inert ingredient may tend to hold a small amount of water, thus forming nuclei for the cells and at the same time depriving the starch of water.

The following are specific examples of the production of ready to eat cereal products of improved texture produced according to the present invention. In three separate trials, titanium dioxide, calcium silicate, and aluminum oxide were individually added to identical formulas which consisted of 26 lbs. rice flour, 24 lbs. yellow corn flour, 9 lbs. sugar, 0.5 lbs. salt, and 4 oz. mono and diglicerides, The trials were conducted using a Wenger Model X-25 extruder having a medium shaft, a cut flight screw, a straight ribbed casing, and a die containing ten 3/16 inch holes two of which were plugged. A control trial run was first conducted using this formula without an inert ingredient. The product produced had relatively large cells, of about 100 microns in diameter, had a bulk density of 6.6 pound per cubic foot, and was brittle and glassy in texture.

In the second run 12 oz. of titanium dioxide was mixed with the above described formula. The product had smaller and more uniform cells of about 30 microns in diameter. It was tender and friable and had a bulk density of 5.9 pounds per cubic foot.

In the third run 12 oz. of calcium silicate was mixed with the basic formula. The product was essentially identical to that produced by run number 2 and its bulk density was 5.2 pounds per cubic foot.

In the last trial 13 oz. of aluminum oxide was added to the basic formula. The product produced was of very light and tender texture with small and uniform cells, and had a bulk density of 4.5.

In the three trials employing inert ingredients described above, the inert ingredients accounted for the following percentage of the total formula on a weigth basis: Titanium dioxide— 1.25%, calcium silicate— 1.25%, aluminum oxide— 1.35%.

In another test, silicon dioxide was added in different amounts to identical formulas consisting of 26 lbs. rice flour, 24 lbs. yellow corn flour, 7 lbs. sugar, 0.5 lbs. salt, and 1 lb. of monoglycrides. The trials were conducted using a Wenger Model X-25 extruder having a medium shaft, cut flight screw, straight ribbed jacket, and a die containing ten 3/16 inch holes, eight of which were plugged. A control trial run was first conducted using this formula without a inert ingredient. The product produced by the control run had moderately open cells of a diameter of about 100 microns and a bulk density of 4.3 pounds per cubic foot.

In the next run, 1 oz. of silicon dioxide (0.1% by weight) was added to the formula. The product produced had the same cell size and bulk density of 5.0 lbs. per cubic ft. In the final run 5 oz. of silicon dioxide (0.52% by weight) was added to the basic formula. The product produced by this run had a smaller cell size of about 60 microns and a more tender and friable texture. The bulk density of this product was 6.3 lbs. per cubic ft. which is commercially acceptable.

In another test, calcium silicate was added in three different amounts to a formula consisting of 50 lbs. yellow corn flour, 20 lbs. rice flour, 35 lbs. wheat flour, 9.5 lb. sugar, 1 lb. salt, and 0.35 lb. monoglycerides. The trials were conducted using a Wenger Model X-25 extruder having a medium shaft, cut flight screw, straight ribbed jacket, and using a 10 holed 3/16 inch die plate. Control runs at both the beginning and end of the trial were made using no calcium silicate, and once the run was begun, no changes were made to the extruder as the formulas were fed in one by one. Thus, any changes in product produced was due solely to the ingredients in the formula. The results of these runs are as follows:

| Formula | Puff description | Cell size |
|---|---|---|
| Control | Hard, glassy | 110 microns |
| 4 oz. Calcium silicate | More tender | 65 microns |
| 8 oz. Calcium silicate | Very tender | 32 microns |
| 12 oz. Calcium silicate | Very tender | 25 microns |
| Control | Hard, glassy | 115 microns |

All of the above products had a commercially acceptable bulk density of between 4 and 7 pounds per cubic foot.

The two sets of trials discussed above were conducted on a laboratory scale. Another trial was run on a production scale wherein the formula included 0.3% by weight of calcium silicate. The formula consisted of 100 lbs. yellow corn flour, 41.1 lbs. rice flour, 70.55 lbs. wheat flour, 31.75 lbs. sugar, 2.12 lbs. salt, 0.71 lbs. mono and di-glycerides, 0.71 lbs. of calcium silicate and normal amounts of vitamins and coloring. The formula was run through a Wenger Model X-150 extruder in 1400 lbs. batches and the resulting product was considerably more tender and friable than conventional high pressure extruded snack products, and had a smaller and more uniform cell size together with acceptable bulk density.

From the foregoing, it will be seen that the present invention provides a method of economically producing expanded cereal products of improved texture using a high temperature and high pressure cooking extruder.

We claim:

1. The method of preparing an expanded ready to eat cereal product having a cellular structure wherein the cells are substantially all of uniform small size comprising the steps of mixing with a quantity of milled grain between about 0.2 and 2% of finely divided, insoluble, inert material selected from the group consisting of titanium dioxide, calcium silicate, aluminum oxide, silicon dioxide, or mixtures thereof, heating the mixture to a temperature above the boiling point of water and mechanically working the heated mixture at a pressure substantially above atmospheric, and expanding the mixture by suddenly releasing the pressure to form cells of uniform small size.

2. The method of claim 1 wherein the majority of said inert material has a particle size below about 4 microns.

3. The method of preparing an expanded ready to eat cereal product having a cellular structure wherein the cells are substantially all of uniform small size comprising the steps of mixing with a quantity of milled grain about 1¼% of finely divided, insoluble, inert material selected from the group consisting of titanium dioxide, calcium silicate, aluminum oxide, or mixtures thereof, heating the mixture to a temperature above the boiling point of water and mechanically working the heated mixture at a pressure substantially above atmospheric, and expanding the mixture by suddenly releasing the pressure to form cells of uniform small size.

4. The method of claim 3 wherein said inert material is titanium dioxide.

5. The method of claim 3 wherein said inert material is calcium silicate.

6. The method of claim 3 wherein said inert material is aluminum oxide.

7. The method of claim 1 wherein said inert material is silicon dioxide and is present in a quantity of about 0.5%.

8. The method of claim 1 wherein said inert material is calcium silicate and is present in a quantity of between 0.2 and 1¼%.

* * * * *